US012665751B2

(12) United States Patent
Lee et al.

(10) Patent No.: US 12,665,751 B2
(45) Date of Patent: Jun. 23, 2026

(54) METHOD, DEVICE, SYSTEM, AND COMPUTER PROGRAM FOR CONSTRUCTING QUANTUM CRYPTOGRAPHIC COMMUNICATION NETWORK

(71) Applicant: Korea Institute of Science and Technology Information, Daejeon (KR)

(72) Inventors: Chankyun Lee, Daejeon (KR); Wonhyuk Lee, Sejong-si (KR)

(73) Assignee: Korea Institute of Science and Technology Information, Daejeon (KR)

( * ) Notice: Subject to any disclaimer, the term of this patent is extended or adjusted under 35 U.S.C. 154(b) by 134 days.

(21) Appl. No.: 18/824,746

(22) Filed: Sep. 4, 2024

(65) Prior Publication Data

US 2026/0095310 A1 Apr. 2, 2026

(30) Foreign Application Priority Data

Feb. 22, 2024 (KR) ........................ 10-2024-0025493

(51) Int. Cl.
*H04L 9/08* (2006.01)

(52) U.S. Cl.
CPC .................................. *H04L 9/0852* (2013.01)

(58) Field of Classification Search
CPC ...................................................... H04L 9/0852
See application file for complete search history.

(56) References Cited

U.S. PATENT DOCUMENTS

| 10,223,182 B2 * | 3/2019 | Takahashi | ........... G06F 11/0709 |
| 10,693,635 B2 * | 6/2020 | Yuan | ..................... H04L 9/0894 |

FOREIGN PATENT DOCUMENTS

KR 10-2019-0004263 A 1/2019

* cited by examiner

*Primary Examiner* — Han Yang

(74) *Attorney, Agent, or Firm* — BROADVIEW IP LAW, PC

(57) ABSTRACT

The present disclosure relates to a method, a device, and a computer program for constructing a quantum cryptographic communication network. More specifically, the present disclosure provides a method for constructing, in a device, a quantum cryptographic communication network including multiple unit nodes which include multiple quantum cryptographic communication unit nodes, including application nodes and quantum key distribution nodes, and one or more relay unit nodes configured to relay between the quantum key distribution nodes, the method including: calculating, for one or more target unit nodes among the multiple unit nodes, a weight reflecting a quantum key demand at the target unit nodes according to communication between the application nodes among the multiple quantum cryptographic communication unit nodes; and selecting one or more unit nodes, which are to be provided with cache servers for the communication between the application nodes, from among the target unit nodes based on the calculated weight.

13 Claims, 14 Drawing Sheets

Fig. 5

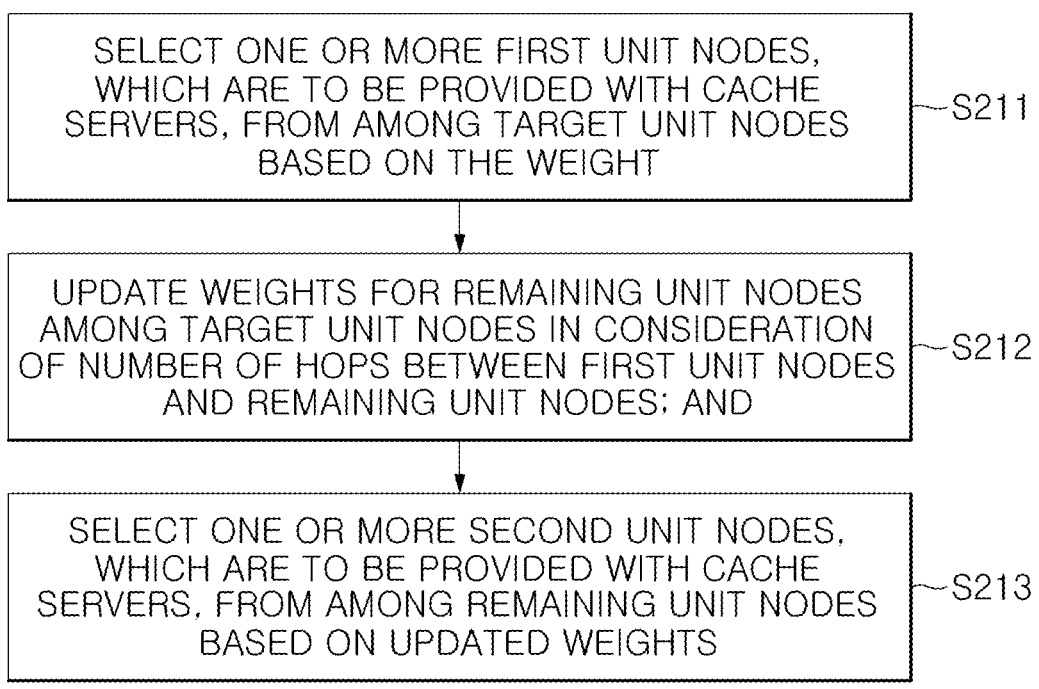

SELECT ONE OR MORE FIRST UNIT NODES, WHICH ARE TO BE PROVIDED WITH CACHE SERVERS, FROM AMONG TARGET UNIT NODES BASED ON THE WEIGHT ~S211

UPDATE WEIGHTS FOR REMAINING UNIT NODES AMONG TARGET UNIT NODES IN CONSIDERATION OF NUMBER OF HOPS BETWEEN FIRST UNIT NODES AND REMAINING UNIT NODES; AND ~S212

SELECT ONE OR MORE SECOND UNIT NODES, WHICH ARE TO BE PROVIDED WITH CACHE SERVERS, FROM AMONG REMAINING UNIT NODES BASED ON UPDATED WEIGHTS ~S213

Fig. 6

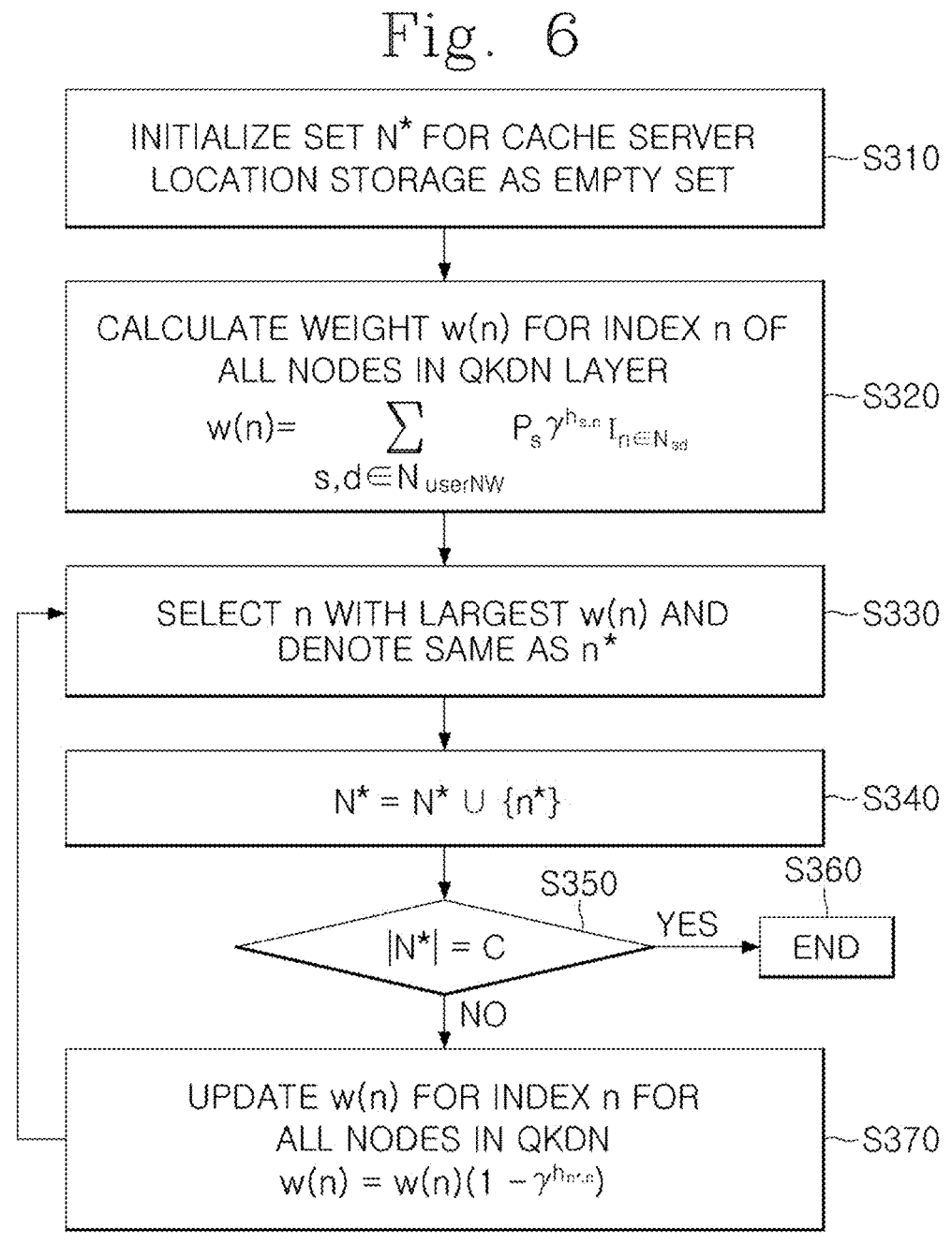

INITIALIZE SET N* FOR CACHE SERVER
LOCATION STORAGE AS EMPTY SET ～S310

CALCULATE WEIGHT w(n) FOR INDEX n OF
ALL NODES IN QKDN LAYER
$$w(n)= \sum_{s,d \in N_{userNW}} P_s \gamma^{h_{s,n}} I_{n \in N_{sd}}$$
～S320

SELECT n WITH LARGEST w(n) AND
DENOTE SAME AS n* ～S330

$$N^* = N^* \cup \{n^*\}$$ ～S340

S350   S360
$$|N^*| = C$$   YES   END

NO

UPDATE w(n) FOR INDEX n FOR
ALL NODES IN QKDN
$$w(n) = w(n)(1 - \gamma^{h_{n,n}})$$
～S370

QUANTUM CRYPTOGRAPHIC
COMMUNICATION UNIT NODE(610)

QUANTUM CRYPTOGRAPHIC
COMMUNICATION UNIT NODE(610)

SERVICE NODE(630)

Request router ~632

Application node ~631

BUFFER SYSTEM(640)

QUANTUM KEY

633 ~ Cache server

KM ~622

623 ~ QUANTUM KEY STORAGE

QUANTUM KEY        QUANTUM KEY

QKD module ... QKD module ~621

QKD NODE(620)

METHOD, DEVICE, SYSTEM, AND COMPUTER PROGRAM FOR CONSTRUCTING QUANTUM CRYPTOGRAPHIC COMMUNICATION NETWORK

CROSS-REFERENCE TO RELATED APPLICATION(S)

This application is based on and claims priority under 35 U.S.C. 119 to Korean Patent Application No. 10-2024-0025493, filed on Feb. 22, 2024, in the Korean Intellectual Property Office, the disclosure of which is herein incorporated by reference in its entirety.

BACKGROUND OF THE INVENTION

1. Field of the Invention

The present disclosure relates to a method, a device, and a computer program for constructing a quantum cryptographic communication network and, more specifically, to a method, a device, and a computer program for constructing a quantum cryptographic communication network, wherein in a quantum cryptographic communication network operating based on limited quantum key resources, the performance of the quantum cryptographic communication network can be effectively improved by providing an optimal node with a cache server.

2. Description of the Prior Art

In recent years, the importance of security in communication systems has continued to grow, and in this regard, quantum cryptographic communication, which can realize a high level of security based on the physical properties of quantum, has gained attention.

More specifically, as shown in FIG. 1, in the quantum cryptographic communication system 100, when communication is performed between a transmitter 110 and a receiver 120, a quantum key may be shared through a quantum channel 130 such as an optical fiber, and based thereon, encrypted communication may be performed, thereby implementing a communication system that can essentially prevent hacking attempts by an attacker 140.

In the quantum cryptographic communication system 100, a pair of quantum key distribution (QKD) devices connected via the quantum channel 130 may share the quantum key by using a quantum key distribution protocol such as BB84, and apply the quantum key to perform encrypted communication.

However, in conventional quantum cryptographic communication systems, quantum keys are generated at a limited secret key rate, and consequently, quantum key resources become a critical factor constraining the performance of the quantum cryptographic communication system 100.

Furthermore, in a quantum cryptographic communication system including multiple nodes, when communication load is concentrated on a specific node, the quantum key resources of the node may become depleted, potentially leading to a decrease in the performance of the entire communication system.

Consequently, there is a continuous demand for solutions to improve the communication performance by more efficiently utilizing limited quantum key resources in quantum cryptographic communication systems. However, no appropriate solution has yet been proposed.

SUMMARY OF THE INVENTION

The present disclosure is invented to solve the above-described problems of the prior art, and an aspect of the present disclosure is to provide a method, a device, a system, and a computer program for constructing a quantum cryptographic communication network, wherein communication performance can be improved by more efficiently utilizing limited quantum key resources in the quantum cryptographic communication system.

More specifically, it is an aspect of the present disclosure to provide a method, a device, a system, and a computer program for constructing a quantum cryptographic communication network, wherein a cache server can be used to improve the performance of the quantum cryptographic communication system.

Other detailed aspects of the present disclosure will be obvious to and understood by researchers or persons skilled in the art through the detailed description below.

A method according to an aspect of the present disclosure to achieve the above tasks is a method for constructing, in a device, a quantum cryptographic communication network including multiple unit nodes which include multiple quantum cryptographic communication unit nodes, including application nodes and quantum key distribution nodes, and one or more relay unit nodes configured to relay between the quantum key distribution nodes. The method may include: calculating, for one or more target unit nodes among the multiple unit nodes, a weight reflecting a quantum key demand at the target unit nodes according to communication between the application nodes among the multiple quantum cryptographic communication unit nodes; and selecting one or more unit nodes, which are to be provided with cache servers for the communication between the application nodes, from among the target unit nodes based on the calculated weight.

In the calculating of the weight, the weight may be calculated in consideration of at least one among the number of users of a site corresponding to a source node in the communication between the application nodes, the amount of communication traffic of the site, and the number of hops between the source node and the target unit nodes.

Furthermore, in the calculating of the weight, the weight may be calculated in consideration of whether the target unit nodes are located on a shortest path between the source node and a destination node corresponding to the source node.

Furthermore, the selecting of the one or more unit nodes may include: selecting one or more first unit nodes, which are to be provided with cache servers, from among the target unit nodes based on the weight; updating weights for remaining unit nodes among the target unit nodes in consideration of the number of hops between the first unit nodes and the remaining unit nodes; and selecting one or more second unit nodes, which are to be provided with cache servers, from among the remaining unit nodes based on the updated weights.

A predetermined number of unit nodes which are to be provided with cache servers may be selected by iteratively updating the weights for the remaining unit nodes.

Furthermore, at least one of the unit nodes which are to be provided with the cache server may include the relay unit nodes.

Furthermore, a quantum cryptographic communication system according to another aspect of the present disclosure is a quantum cryptographic communication system including multiple unit nodes which include: multiple quantum cryptographic communication unit nodes including application nodes and quantum key distribution nodes; and one or more relay unit nodes configured to relay between the quantum key distribution nodes, wherein cache servers for communication between the application nodes among the multiple quantum cryptographic communication unit nodes may be provided in one or more unit nodes selected from among one or more target unit nodes among the multiple unit nodes based on a weight that is calculated for the target unit nodes and reflects a quantum key demand at the target unit nodes according to the communication between the application nodes.

The weight may be calculated in consideration of at least one among the number of users of a site corresponding to a source node in the communication between the application nodes, the amount of communication traffic of the site, and the number of hops between the source node and the target unit nodes.

Furthermore, the weight may be calculated in consideration of whether the target unit nodes are located on a shortest path between the source node and a destination node corresponding to the source node.

Furthermore, the cache servers may be provided in: one or more first unit nodes selected from among the target unit nodes based on the weight; and one or more second unit nodes selected from among the remaining unit nodes among the target unit nodes based on weights updated for the remaining unit nodes in consideration of the number of hops between the first unit nodes and the remaining unit nodes.

The cache servers may be provided in a predetermined number of unit nodes selected by iteratively updating the weights for the remaining unit nodes.

At least one of the unit nodes which are to be provided with the cache server may include the relay unit nodes.

Furthermore, a computer-readable storage medium according to another aspect of the present disclosure is a computer-readable storage medium storing instructions configured to cause, when executed by a processor, a device including the processor to implement specific operations, wherein the specific operations may include: for a quantum cryptographic communication network including multiple unit nodes which include multiple quantum cryptographic communication unit nodes, including application nodes and quantum key distribution nodes, and one or more relay unit nodes configured to relay between the quantum key distribution nodes, calculating, for one or more target unit nodes among the multiple unit nodes, a weight reflecting a quantum key demand at the target unit nodes according to communication between the application nodes among the multiple quantum cryptographic communication unit nodes; and selecting one or more unit nodes, which are to be provided with cache servers for the communication between the application nodes, from among the target unit nodes based on the calculated weight.

Accordingly, the method, the device, the system, and the computer program for constructing a quantum cryptographic communication network according to an embodiment of the present disclosure may improve communication performance in a quantum cryptographic communication system by more efficiently utilizing limited quantum key resources.

More specifically, the method, the device, the system, and the computer program for constructing a quantum cryptographic communication network according to an embodiment of the present disclosure may improve the performance of a quantum cryptographic communication system by using a cache server.

The effects to be obtained from the present disclosure are not limited to the above-described effects, and other effects that have not been described will be clearly understood by those skilled in the art, to which the present disclosure belongs, from the description in the specification.

BRIEF DESCRIPTION OF THE DRAWINGS

The accompanying drawings, which are included as part of the detailed description to facilitate an understanding of the present disclosure, provide embodiments of the present disclosure and, together with the detailed description, illustrate the technical idea of the present disclosure.

FIG. 5 is a specific flowchart of a selection step of a method for constructing a quantum cryptographic communication system according to an embodiment of the present disclosure;

FIG. 6 illustrates a specific flowchart of a method for constructing a quantum cryptographic communication system according to an embodiment of the present disclosure;

DETAILED DESCRIPTION OF THE EXEMPLARY EMBODIMENTS

The present disclosure may undergo various modifications and may have multiple embodiments. Hereinafter, specific embodiments will be described in detail below with reference to the accompanying drawings.

The following embodiments are provided to facilitate a comprehensive understanding of a method, a device, and/or a system described in the specification. However, these are merely examples, and the present disclosure is not limited thereto.

In describing embodiments of the present disclosure, a detailed description of the prior art related to the present disclosure will be omitted when it is determined that such detailed description may unnecessarily obscure the subject matter of the present disclosure. The terms which will be described below are terms defined in consideration of the functions in the present disclosure, and may vary depending on users, intentions of the users, or customs. Therefore, the definitions of the terms should be made based on the contents throughout the specification. The terms used in the detailed description are intended only to describe embodiments of the present disclosure and should not be considered as limiting. Unless the context clearly indicates otherwise, expressions in the singular form shall include the meaning of the plural form. In the description, the terms such as "include" or "comprise" are intended to indicate certain features, numbers, steps, operations, elements, or some or combinations thereof, and should not be interpreted as excluding the presence or possibility of one or more features, numbers, steps, operations, elements, or some or combinations thereof other than those described.

Furthermore, terms such as "first", "second", and the like may be used to describe various constituent elements, but the constituent elements are not limited by the terms. The terms are used only to distinguish one element from another element.

Hereinafter, exemplary embodiments of a method, a device, and a computer program for constructing a quantum cryptographic communication network according to the present disclosure will be described in detail with reference to the accompanying drawings.

Figure 1:
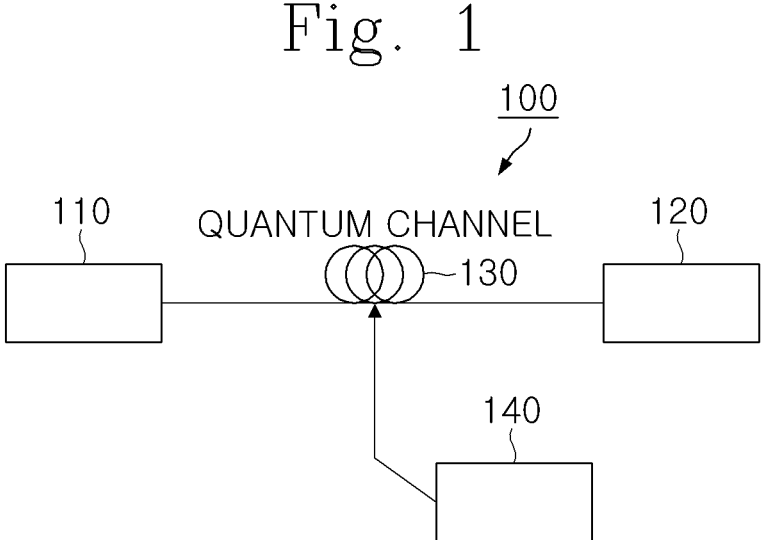
FIG. 1 illustrates the configuration of a quantum cryptographic communication system according to an embodiment of the present disclosure.

FIG. 1 illustrates the configuration of a quantum cryptographic communication system 100 according to an embodiment of the present disclosure. As shown in FIG. 1, the quantum cryptographic communication system 100 according to an embodiment of the present disclosure may include two or more quantum cryptographic communication nodes 110 and 120 and a quantum channel 130 configured to connect the two or more quantum cryptographic communication nodes 110 and 120, wherein the quantum cryptographic communication system 100 may secure superior security by fundamentally blocking hacking attempts by an attacker 140 through quantum cryptographic communication utilizing the physical properties of quantum.

In the quantum cryptographic communication system 100, quantum key distribution (QKD) modules connected by the quantum channel 130, such as an optical fiber, capable of transmitting quantum information, are provided in the quantum cryptographic communication nodes 110 and 120 to share a quantum key through various quantum key distribution protocols, such as BB84, and to perform quantum cryptographic communication based on the shared quantum key.

Figure 2:
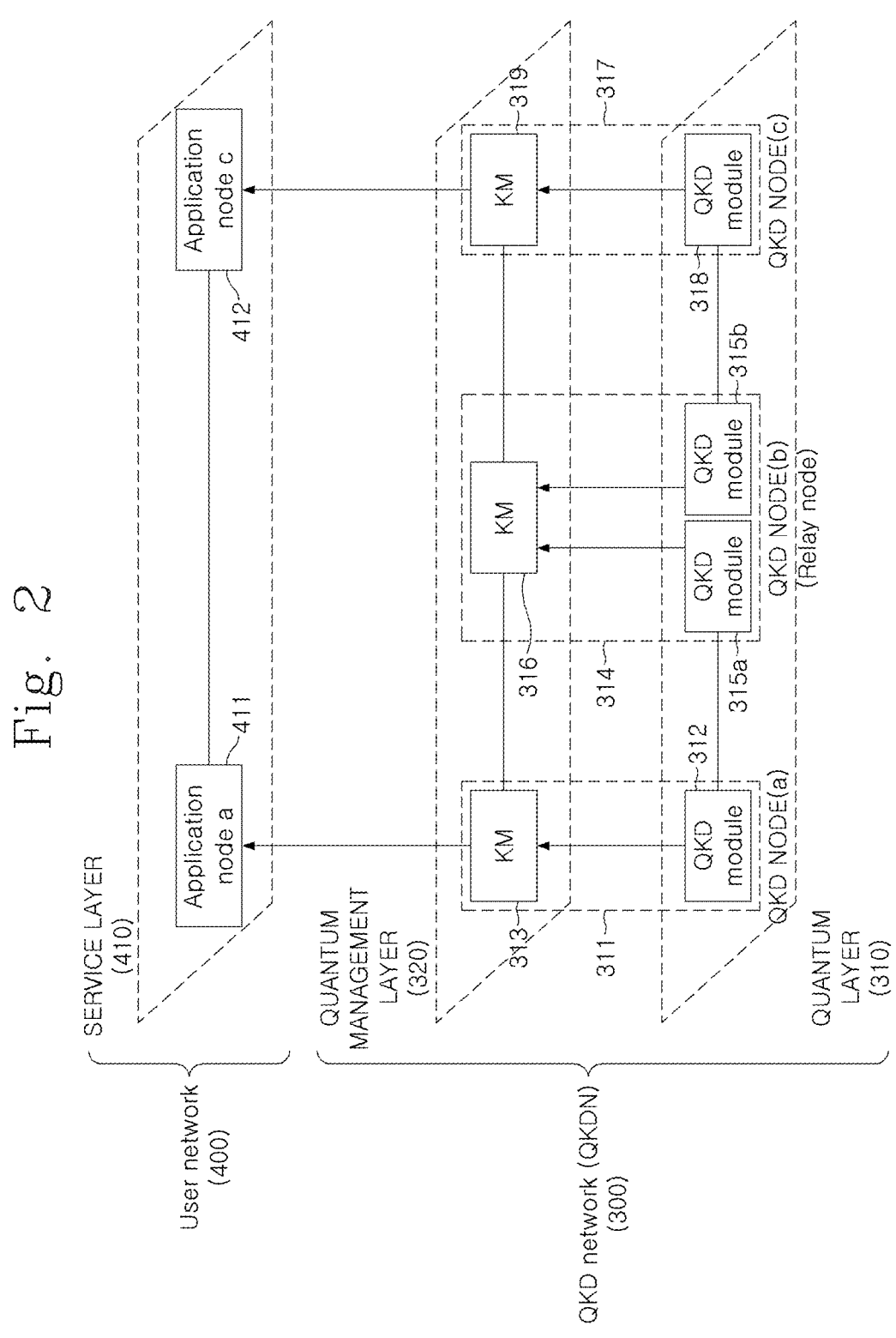
FIGS. 2, 3A, 3B and 3C illustrate the configuration and operation of a quantum cryptographic communication system according to an embodiment of the present disclosure.

As shown in FIG. 2, the quantum cryptographic communication system 100 may be implemented as a hierarchical structure, and more specifically may include a quantum key distribution network (QKDN) 300, which includes a quantum layer 310 configured to distribute and generate a quantum key and a quantum key management layer 320 configured to receive and manage the generated quantum key, and a user network 400, which includes a service layer 410 configured to perform encrypted communication by using the generated quantum key.

As shown in FIG. 2, the quantum layer 310 may include a quantum key distribution module 312 connected by the quantum channel 130, and the quantum key management layer 320 may include a quantum key management node (key management (KM)) 313.

The quantum key management module 313 and the quantum key distribution module 312 may be disposed at the same site or within a distance close to each other to constitute a quantum key distribution (QKD) node 311.

Furthermore, in the quantum cryptographic communication system 100, a service layer 410 may constitute the user network 400, and the quantum key management layer 320 and the quantum layer 310 may constitute the quantum key distribution network (QKDN) 300.

Furthermore, as shown in FIG. 2, the quantum cryptographic communication system 100 may include a relay node 314 configured to relay quantum keys in consideration of distance constraints between the quantum key distribution (QKD) modules 312 and 318, and the like. Thus, the topology of the user network 400 may be configured differently from the topology of the quantum key distribution network (QKDN) 300.

Figure 3A:
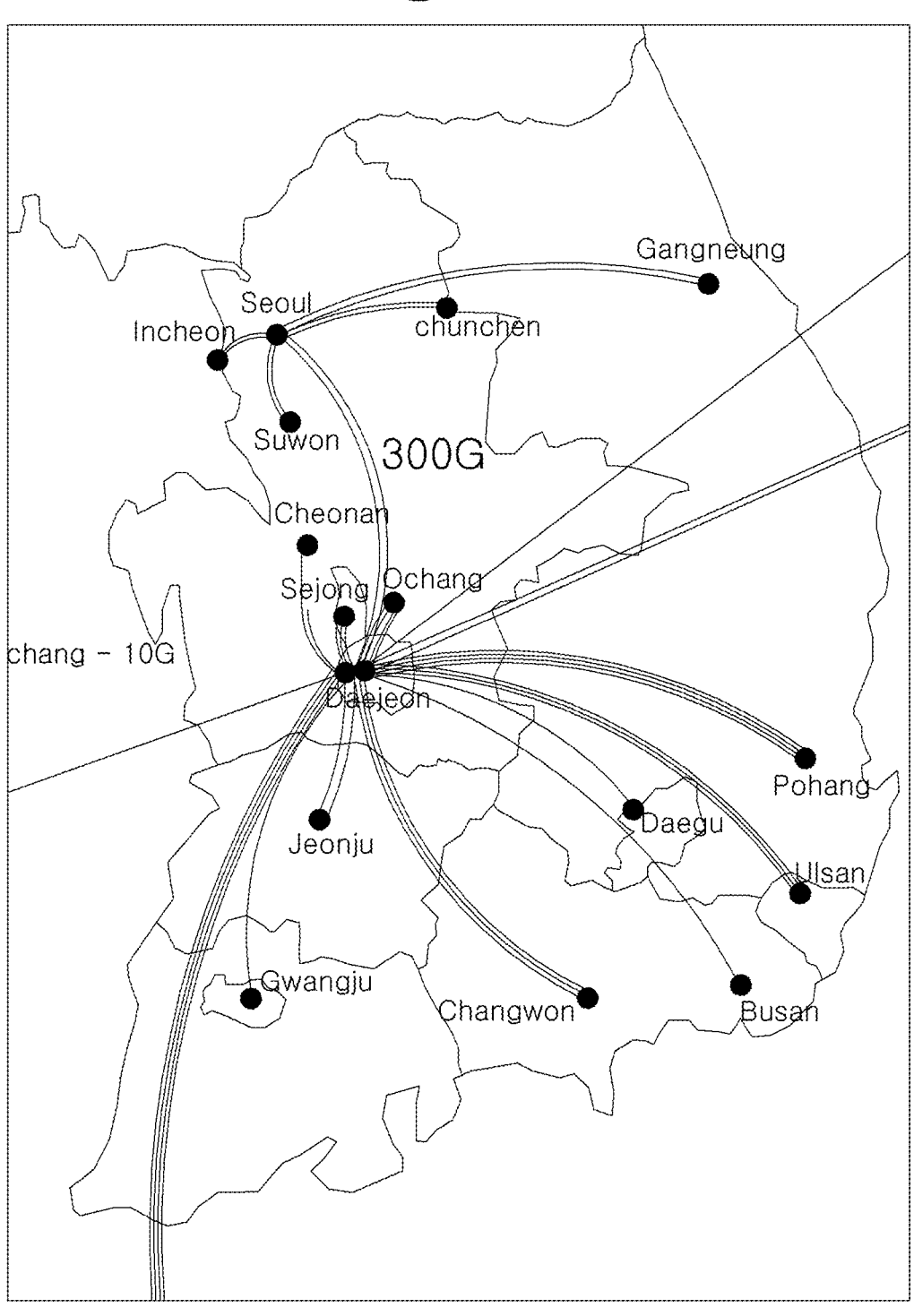
Figure 3B:
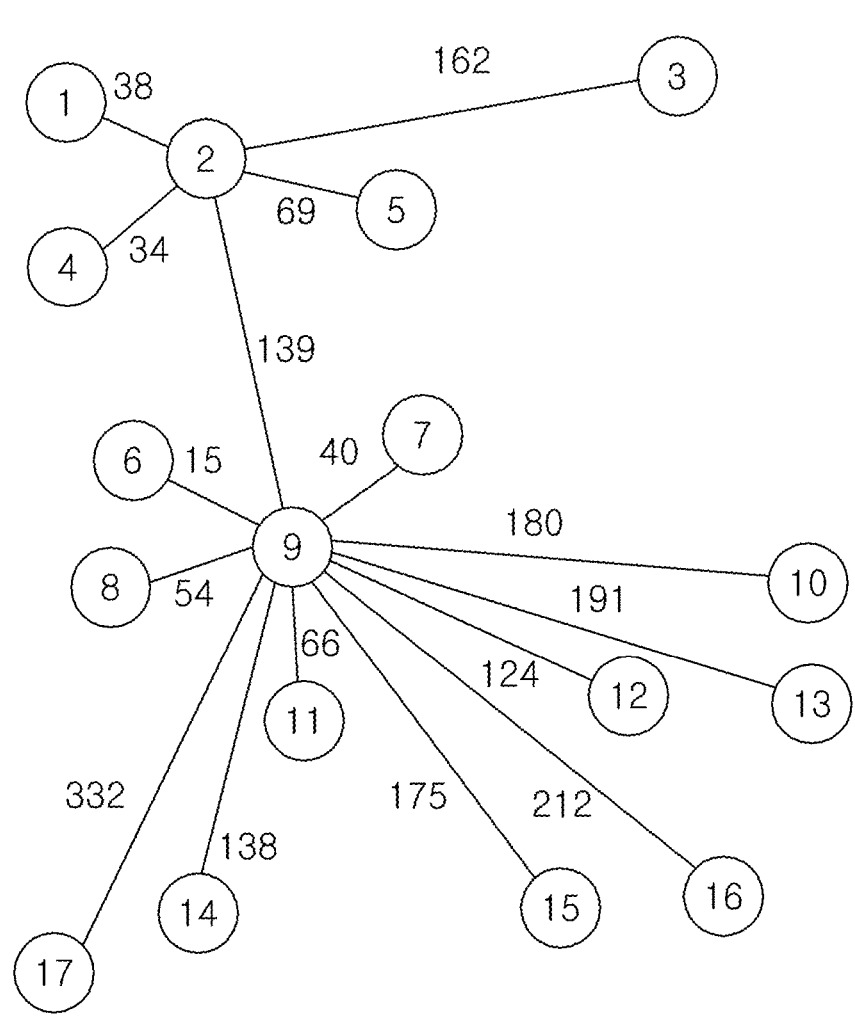

For a more specific example, in the case where the user network 400 is given as in FIG. 3B in a communication network connecting each region of the Republic of Korea as in FIG. 3A, a number within each node of the user network in FIG. 3B may indicate the index of the node, and a number on each link may indicate the length of the link (e.g., the distance between node 1 and node 2 in FIG. 3B is 38 km).

Figure 3C:
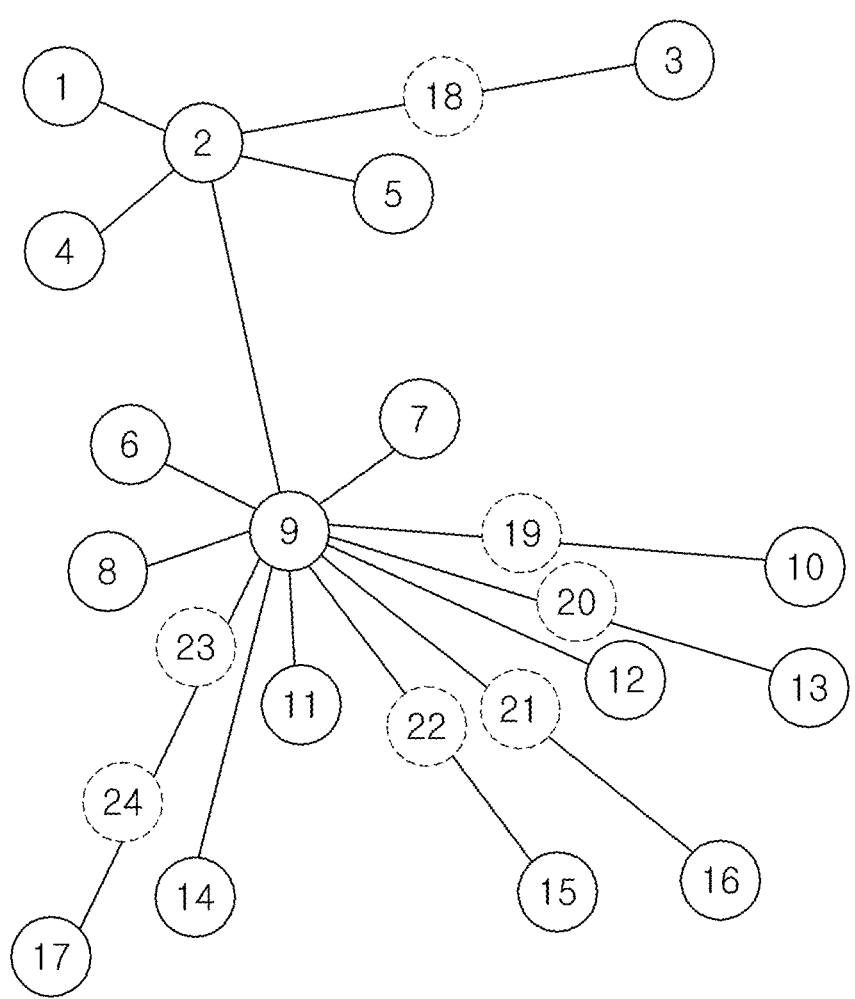

In contrast, FIG. 3C illustrates an example in which the quantum key distribution network (QKDN) 300 is configured to ensure that the distance between quantum key distribution (QKD) modules in the quantum key distribution network (QKDN) 300 does not exceed a predetermined reference distance (e.g., 150 kilometers) by installing relay nodes within links that exceed the predetermined reference distance.

For a more specific example, in FIG. 3B, the link length between node 2 and node 3 is 162 km, which is greater than the reference distance (e.g., 150 km), so FIG. 3C illustrates the case in which node 18 is installed as a relay node midway between node 2 and node 3.

Furthermore, in FIGS. 3A, 3B and 3C, a quantum key distribution network (QKDN) topology is configured by installing relay nodes in the middle of links in the quantum key distribution network (QKDN) to limit the distance between quantum key distribution (QKD) modules to 150 km or less. However, this is an example and the present disclosure is not necessarily limited thereto. Furthermore, it is possible to variously configure the reference distance between the quantum key distribution modules and the relay node installation location in consideration of the secret key generation rate and the relay node installation cost in the quantum key distribution module.

In particular, in the quantum cryptographic communication system 100, quantum key resources may be significantly dependent on the secret key generation rate in the quantum key distribution modules. At the current level of quantum technology, the secret key generation rate has not been dramatically improved, thus making the quantum key resources one of main factors limiting the performance of the quantum cryptographic communication system 100.

Accordingly, when a service request based on quantum cryptographic communication are concentrated in a specific section of the quantum cryptographic communication system 100, a service may be limited due to a lack of quantum keys if sufficient quantum key resources are not generated or secured in advance in the specific section.

In response thereto, in the quantum cryptographic communication network 100 according to an embodiment of the present disclosure, a cache server may be provided in an optimal node to minimize the service limitation due to the lack of quantum keys that may occur in the specific section, thereby effectively improving the performance of the quantum cryptographic communication network 100.

More specifically, in the quantum cryptographic communication network 100 according to an embodiment of the present disclosure, one or more cache servers 633 are distributed and arranged within the quantum cryptographic communication network 100, data used in the service, such as content, is stored in the cache servers 633, and then, when a request for a service is made, the request for the service is processed using a source of the data such as the content or the cache servers 633 that stores the same.

In the quantum cryptographic communication network 100 according to an embodiment of the present disclosure, the cache server 633 physically adjacent to a node in which the request for the service is made may be used to provide data such as content used in the service, thereby effectively reducing the number of quantum keys required for quantum cryptographic communication.

For a more specific example, in FIG. 2, when an application node a 411 is a content requestor and a source of requested content is an application node c 412, conventionally, one quantum key between a quantum key distribution node (a) 311 and a quantum key distribution node (b) 314 and one quantum key between the quantum key distribution node (b) 314 and a quantum key distribution node (c) 317 are each consumed, and data is encrypted and transmitted by consuming a total of two quantum keys, but in the present disclosure, if a cache server 633 for storing the content has been installed in the quantum key distribution node (b) 314, the content is transmitted from the cache server 633, so that the number of quantum keys consumed may be reduced to one quantum key consumed between the quantum key distribution node (a) 311 and the quantum key distribution node (b) 314.

Figure 4:
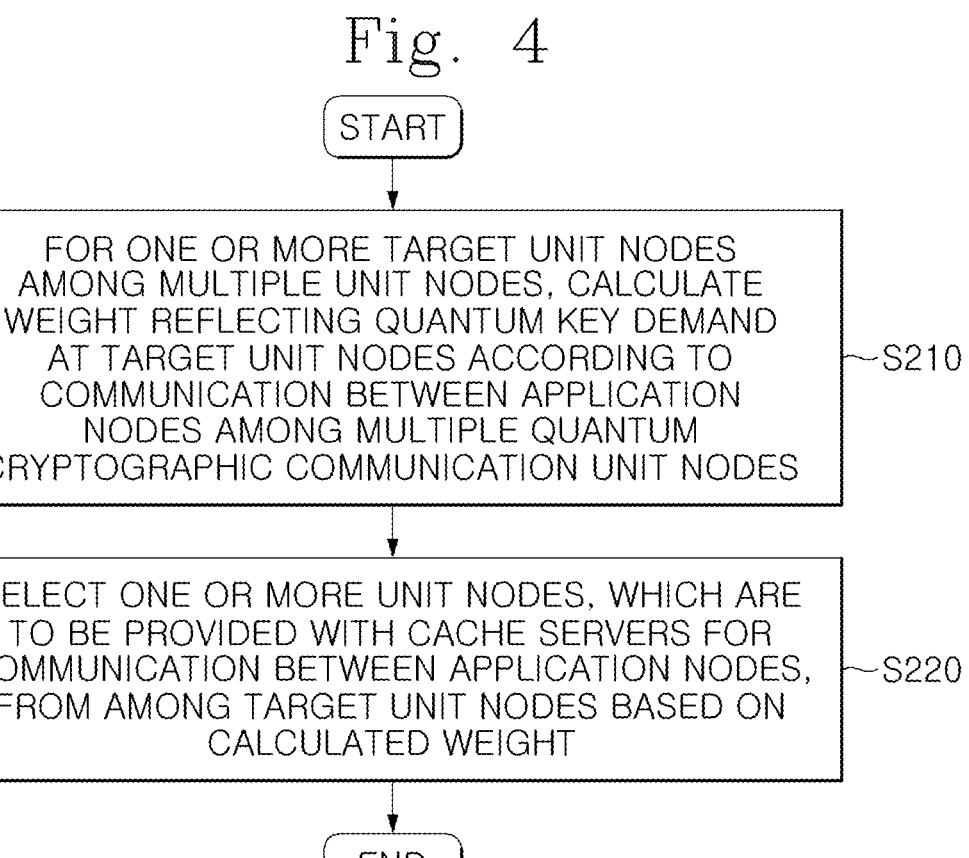
FIG. 4 is a flowchart of a method for constructing a quantum cryptographic communication system according to an embodiment of the present disclosure.

Furthermore, FIG. 4 illustrates a flowchart of a method for constructing a quantum cryptographic communication network according to an embodiment of the present disclosure.

The method illustrated in FIG. 4 may be performed by, for example, a quantum cryptographic communication network constituent device including a server or the like. Furthermore, the quantum cryptographic communication network constituent device may be implemented to include a computing device in FIG. 12 and a description made later in relation to FIG. 12. For example, the quantum cryptographic communication network constituent device may include a processor 10, wherein the processor 10 executes an instruction configured to cause the processor 10 to select a node to be provided with a cache server in the quantum cryptographic communication network.

More specifically, as shown in FIG. 4, the method for constructing a quantum cryptographic communication network, according to an embodiment of the present disclosure, is a method for constructing, in a device, a quantum cryptographic communication network 100 including multiple unit nodes which include multiple quantum cryptographic communication unit nodes 610, including application nodes 411 and quantum key distribution nodes 311, and one or more relay unit nodes 650 configured to relay between the quantum key distribution nodes 311. The method may include: calculating, for one or more target unit nodes among the multiple unit nodes, a weight reflecting a quantum key demand at the target unit nodes according to communication between the application nodes 411 among the multiple quantum cryptographic communication unit nodes 610 (S210); and selecting one or more unit nodes, which are to be provided with cache servers 633 for the communication between the application nodes 411, from among the target unit nodes based on the calculated weight (S220).

In the calculating step S210, the weight may be calculated in consideration of at least one among the number of users of a site corresponding to a source node in the communication between the application nodes 411, the amount of communication traffic of the site, and the number of hops between the source node and the target unit nodes.

Furthermore, in the calculating step S210, the weight may be calculated in consideration of whether the target unit nodes are located on a shortest path between the source node and a destination node corresponding to the source node.

Furthermore, the selecting step S220 may include: selecting one or more first unit nodes, which are to be provided with cache servers, from among the target unit nodes based on the weight (S211); updating weights for remaining unit nodes among the target unit nodes in consideration of the number of hops between the first unit nodes and the remaining unit nodes (S212); and selecting one or more second unit nodes, which are to be provided with cache servers 633, from among the remaining unit nodes based on the updated weights (S213).

A predetermined number of unit nodes which are to be provided with the cache servers 633 may be selected by iteratively updating the weights for the remaining unit nodes.

At least one of the unit nodes which are to be provided with the cache server may include the relay unit nodes 650.

Accordingly, the method, the device, the system, and the computer program for constructing a quantum cryptographic communication network, according to an embodiment of the present disclosure, may improve communication performance in the quantum cryptographic communication system 100 by more efficiently utilizing limited quantum key resources, and more specifically, may efficiently improve the performance of the quantum cryptographic communication system 100 by using the cache server 633 provided in an optimal node.

Hereinafter, the method, the device, and the system for constructing a quantum cryptographic communication network, according to an embodiment of the present disclosure, will be described in detail for each configuration with reference to the respective drawings.

In the present disclosure, the quantum cryptographic communication network 100 may include multiple unit nodes, which include multiple quantum cryptographic communication unit nodes 610 including application nodes 631 and quantum key distribution nodes 620, and the one or more relay unit nodes 650 configured to relay between the quantum key distribution nodes 620.

In the calculating step S210, for one or more target unit nodes among the multiple unit nodes, a weight reflecting a quantum key demand at the target unit nodes according to communication between the application nodes 411 among the multiple quantum cryptographic communication unit nodes 610 may be calculated.

In the calculating step S210, the weight may be calculated in consideration of at least one among the number of users of a site corresponding to a source node in the communication between the application nodes 411, the amount of communication traffic of the site, and the number of hops between the source node and the target unit nodes.

Furthermore, in the calculating step S210, the weight may be calculated in consideration of whether the target unit nodes are located on a shortest path between the source node and a destination node corresponding to the source node.

More specifically, as shown in FIG. 5, the selecting step S220 may include: selecting one or more first unit nodes, which are to be provided with cache servers, from among the target unit nodes based on the weight (S211); updating weights for remaining unit nodes among the target unit nodes in consideration of the number of hops between the first unit nodes and the remaining unit nodes (S212); and selecting one or more second unit nodes, which are to be provided with the cache servers 633, from among the remaining unit nodes based on the updated weights (S213).

Installation of the cache servers 633 for storing data, such as content, in the quantum cryptographic communication system 100 according to an embodiment of the present disclosure incurs installation and management costs, and it is therefore important to install a limited number of cache servers 633 in optimal efficient locations.

Accordingly, in the quantum cryptographic communication system 100 according to an embodiment of the present disclosure, a limited number (e.g., C) of cache servers 633 may be optimally located in the quantum cryptographic communication system 100, thereby increasing the efficiency of the quantum cryptographic communication system 100 and reducing the cost of operating and managing the quantum cryptographic communication system 100.

In the quantum cryptographic communication system 100 according to an embodiment of the present disclosure, the location where each of the cache servers 633 may be installed may be a part of a set of multiple unit nodes which constitute the quantum cryptographic communication network 100 and include the quantum cryptographic communication unit nodes 610 and the relay unit nodes 650.

Accordingly, in the selecting step S220, one or more unit nodes which are to be provided with the cache servers 633 for communication between the application nodes 411 are selected from among the target unit nodes based on the calculated weight.

Furthermore, in the present disclosure, a predetermined number of unit nodes which are to be provided with the cache servers 633 may be selected by iteratively updating the weights of the remaining unit nodes.

In this regard, FIG. 6 illustrates a specific flowchart of a method for configuring a quantum cryptographic communication system according to an embodiment of the present disclosure.

More specifically, in step S310, a node set N* to be selected as locations where the cache servers 633 is to be installed is initialized as an empty set.

In step S320, a weight w(n) of each node is calculated for the index n of all nodes in the quantum key distribution network (QKDN) 300.

The weight may be calculated in consideration of the number of users of a site corresponding to a source node, the amount of communication traffic of the site, the number of hops between the source node and target unit nodes, and the like.

Furthermore, the weights may be calculated in consideration of whether target unit nodes are located on the shortest path between a source node and a destination node corresponding to the source node.

Accordingly, the above weight may be calculated for each node based on Equation 1 below.

$$w(n) = \sum_{s,d \in N_{userNW}} P_s \gamma^{h_{s,n}} I_{n \in N_{sd}} \qquad \text{[Equation 1]}$$

Here, $N_{userNW}$ denotes a node set in the user network 400 in the quantum cryptographic communication system 100. Furthermore, $P_s$ denotes the number of users at each site, such as a city, corresponding to a node s in the user network 400, and $\gamma$ is a scaling factor, and may have a value between 0 and 1. In addition, $h_{s,n}$ denotes the number of hops between nodes s and n, and $N_{sd}$ denotes a node set in the shortest distance path connecting nodes s and d. Also, $I_{x=N_{sd}}$ can be calculated as 1 if the node n belongs to $N_{sd}$ and 0 otherwise.

Accordingly, the weight of node n, w(n), may have a large value when the shortest path connects each node with a short distance (i.e., a small number of hops) in a node with a large number of users.

In step S330, after calculating the weights for all nodes n, a node n* with the largest weight is selected, and in step S340, the selected node n* is added to N*.

Furthermore, FIG. 6 illustrates selecting only one node having the largest weight in step S330. However, the present disclosure is not necessarily limited thereto, and it is possible to select two or more nodes based on the weight and add the selected nodes to add to N*.

Accordingly, in step S350, it is determined whether the size of N* is equal to a predetermined number C of cache servers. When the size of N* is equal to a predetermined number C of cache servers, the process terminates, and a cache server 633 is installed at the location of each node in N* (S360).

On the other hand, when the size of N* is less than the predetermined number C of cache servers, an additional node is selected for installation of the cache server 633.

To this end, in step S370, the currently selected node n* may be used to update weights w(n) for each of the remaining nodes.

The update of the weights for the remaining nodes may be calculated based on the distance from the selected node, n*, as shown in Equation 2 below.

$$w(n) = w(n)\left(1 - \gamma^{h_{n^*,n}}\right) \qquad \text{[Equation 2]}$$

More specifically, with reference to Equation 2, the weight w(n) of the node n may be updated based on the hop distance between the node n and the selected node n*. Accordingly, the weight of a node located close to the node n* may decrease significantly compared to the weight of a node located farther from the node n*, and then the process of additionally selecting, based on the updated weights, locations of nodes in which the cache servers 633 are to be installed may be repeated by repeating step S330 and subsequent steps.

Furthermore, FIG. 6 illustrates that locations of nodes where the cache servers 633 are to be installed are additionally selected by updating the weight of each node through step S370. However, the present disclosure is not necessarily limited thereto, and it is possible to select all locations of nodes where the cache servers 633 are to be installed, based on the weights calculated in step S320.

Furthermore, in the quantum cryptographic communication system 100 according to an embodiment of the present disclosure, the unit nodes in which the cache servers 633 are to be provided may include one or more relay unit nodes 650.

Figures 7A, 7B:
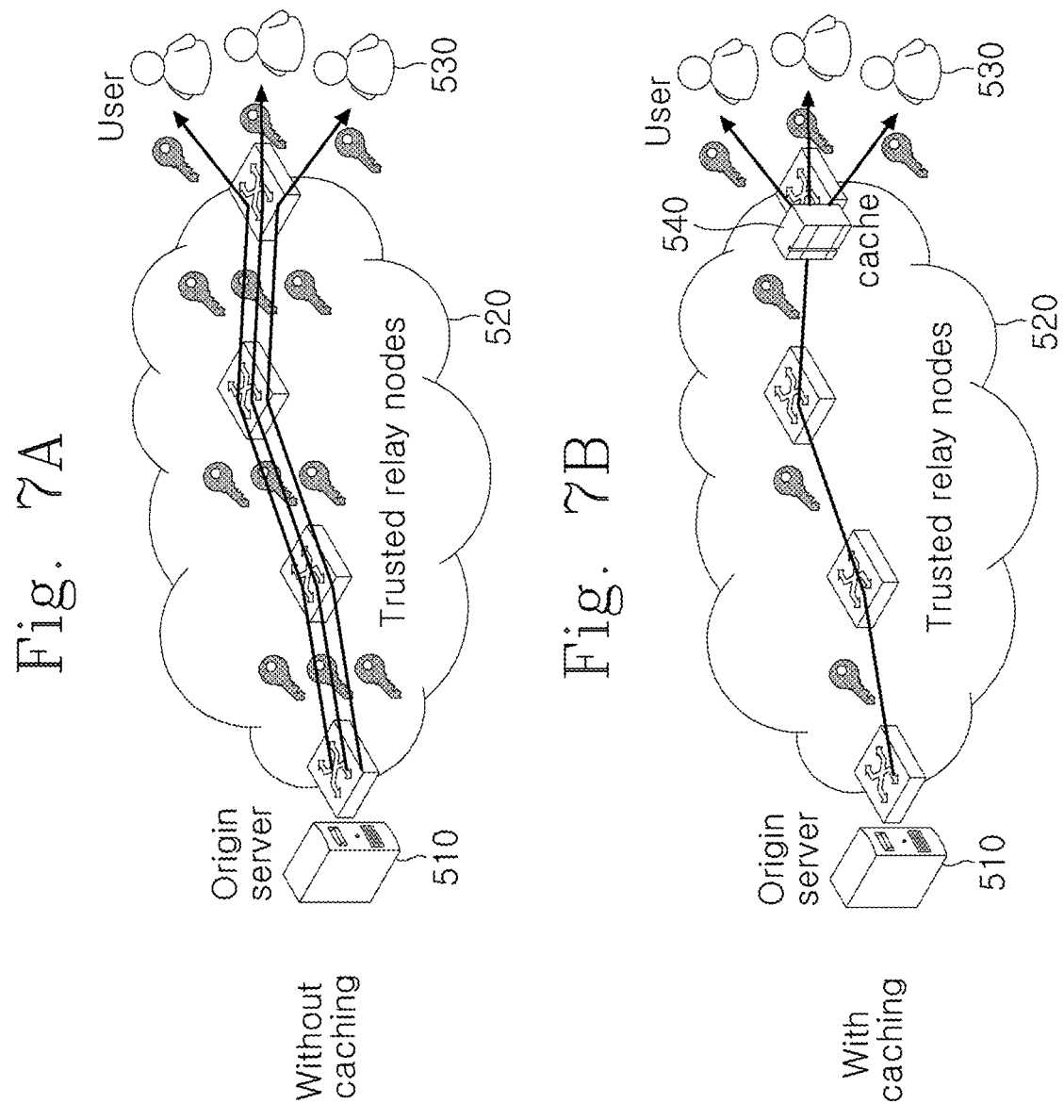
FIGS. 7A and 7B illustrate the operation of a cache server of a quantum cryptographic communication system according to an embodiment of the present disclosure.

Accordingly, as shown in FIGS. 7A and 7B, in the quantum cryptographic communication system 100 according to an embodiment of the present disclosure, by installing a cache server 540 in an optimal node including the one or more relay unit nodes in the quantum cryptographic communication system 100, quantum cryptographic communications can be performed with fewer quantum keys than conventionally required for quantum cryptographic communications (FIG. 7A). In addition, traffic to be processed in the quantum cryptographic communication system 100 may be reduced, and furthermore, traffic may be prevented from being concentrated in a specific section, thereby improving the efficiency of the quantum cryptographic communication system 100 (FIG. 7B).

Furthermore, in the quantum cryptographic communication system 100 according to an embodiment of the present disclosure, in order to process the data such as content required for a service by using a cache server 633, it may be necessary to install the cache server 633 for storing the data such as the content, and a request router 632 for selecting an optimal cache server 633 for a user request.

Accordingly, FIGS. 8 to 11 each illustrate examples of the configuration of unit nodes in the quantum cryptographic communication system 100 in the case where a cache server 633 is installed in a quantum cryptographic communication unit node 610 that includes an application node 631, and in the case where a cache server 633 is installed in a relay unit node 650 that does not include an application node 631.

Figure 8:
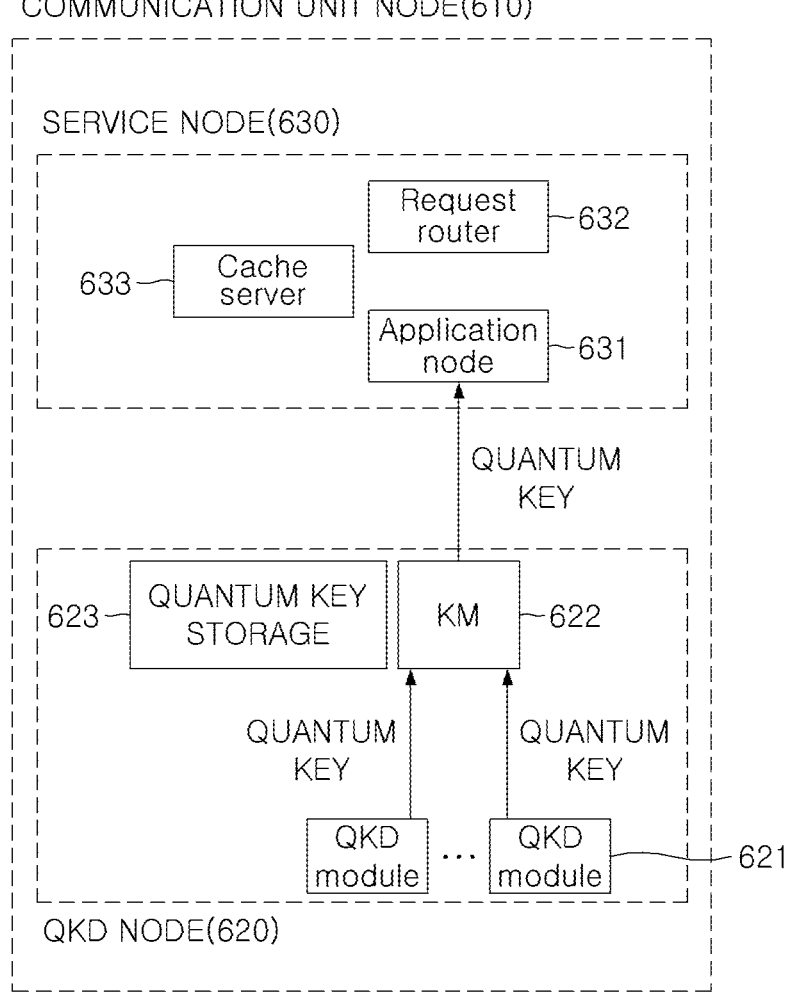
FIGS. 8 to 11 illustrate specific configurations of unit nodes of a quantum cryptographic communication system according to an embodiment of the present disclosure.

FIG. 8 illustrates a case where a unit node, in which a cache server 633 is to be installed, is a quantum cryptographic communication unit node 610 including an application node 631.

As shown in FIG. 8, the quantum cryptographic communication unit node 610 may include a quantum key distribution node 620 and a service node 630.

Furthermore, the quantum key distribution node 620 may include one or more quantum key management modules 622 and one or more quantum key distribution modules 621 connected to the quantum key management modules 622.

Furthermore, the quantum key distribution node 620 may further include a quantum key storage 623 that stores a quantum key from quantum keys management modules 622.

Furthermore, the service node 630 may include the application node 631 of a service layer 410, the cache server 633, and a request router 632.

The service node 630 configured in this manner may belong to the service layer 410 of the user network 400 in the quantum cryptographic communication system 100.

Although FIG. 8 illustrates a configuration in which the service node 630 in the quantum cryptographic communication unit node 610 includes the cache server 633 and the request router 632, the present disclosure is not necessarily limited thereto. For example, there may be various types of configurations such as a configuration in which a data transmission node (not shown) is configured separately from the quantum cryptographic communication unit node 610 so that the cache server 633 and the request router 632 are included in the data transmission node (not shown).

Figure 9:
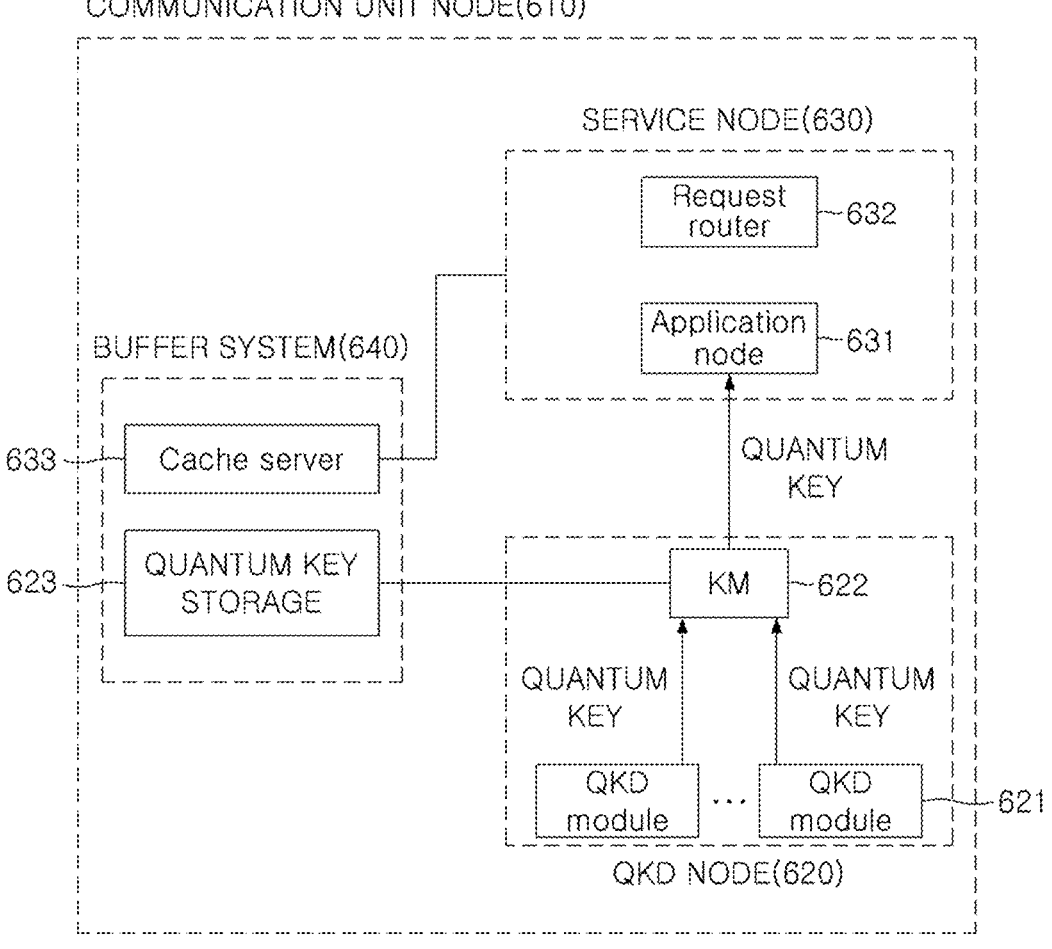

Furthermore, FIG. 9 illustrates that, when a unit node in which a cache server 633 is to be installed is a quantum cryptographic communication unit node 610 including an application node 631, the quantum cryptographic communication unit node 610 is configured using a buffer system 640.

More specifically, as shown in FIG. 9, the quantum cryptographic communication unit node 610 may include a service node 630, a buffer system 640, and a quantum key distribution node 620.

The buffer system 640 may include a cache server 633 for storing data required by the service, such as content, and a quantum key storage 623 for storing quantum keys. The separate buffer system 640 may be configured to perform more efficient management of resources that require buffering.

Although FIG. 9 illustrates a configuration in which the service node 630 in the quantum cryptographic communication unit node 610 includes a request router 632, the present disclosure is not necessarily limited thereto. For example, there may be various types of configurations such as a configuration in which a data transmission node (not shown) is configured separately from the quantum cryptographic communication unit node 610 so that the request router 632 is included in the data transmission node (not shown).

Figure 10:
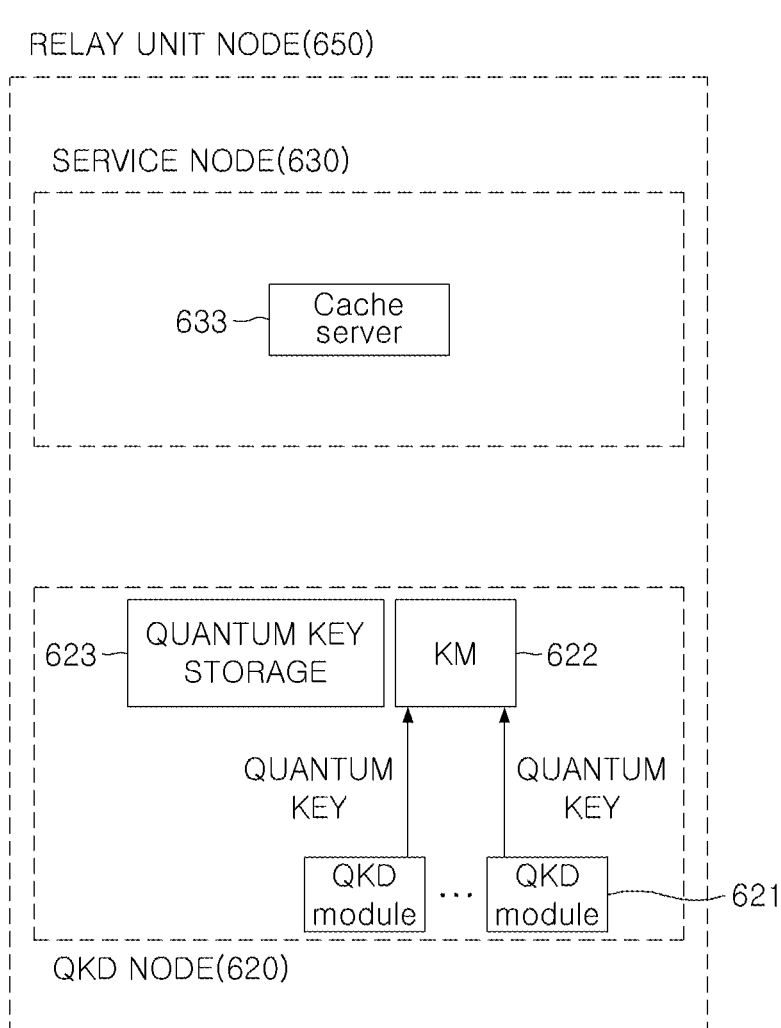

Furthermore, FIG. 10 illustrates a case where a unit node, in which a cache server 633 is to be installed, is a relay unit node 650 that does not include an application node 631.

As shown in FIG. 10, the relay unit node 650 may include a quantum key distribution node 620 and a service node 630, wherein a cache server 633 may be included in a separate service node 630 that is distinct from the quantum key distribution node 620.

In this case, a request router 632 may be omitted because no user requests are generated in the relay unit node 650.

Furthermore, although FIG. 10 illustrates a configuration in which the cache server 633 is included in the service node 630 within the relay unit node 650, the present disclosure is not necessarily limited thereto. For example, there may be various types of configurations such as a configuration in which a data transmission node (not shown) is configured separately from the relay unit node 650 so that the cache server 633 is included in the data transmission node (not shown).

Figure 11:
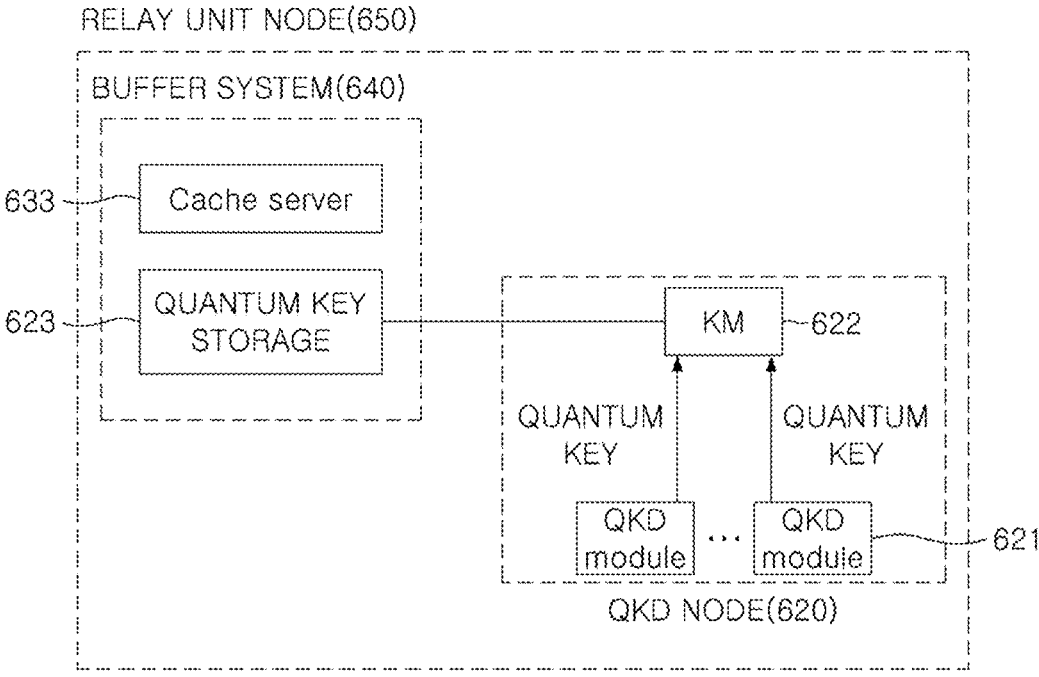

Furthermore, FIG. 11 illustrates that, when a unit node in which a cache server 633 is to be installed is a relay unit node 650 that does not include an application node (631), the relay unit node 650 is configured using a buffer system (640).

More specifically, as shown in FIG. 11, the relay unit node 650 may include a buffer system 640 and a quantum key distribution node 620.

The buffer system 640 may include a cache server 633 for storing data required by a service, such as content, and a quantum key store 623 for storing quantum keys. The separate buffer system 640 may be configured to perform more efficient management of resources that require buffering.

Furthermore, the computer program according to one aspect of the present disclosure is a computer program stored in a computer-readable medium in order to execute, on a computer, each of the steps of the method for constructing a quantum cryptographic communication network, described above. The computer program may be a computer program including machine language code generated by a compiler, as well as a computer program including high-level language code that can be executed on a computer by using an interpreter or the like. The computer is not limited to a personal computer (PC) or a laptop computer, but includes any information processing device, such as a server, a smartphone, a tablet PC, PDA, and a mobile phone, which includes a central processing unit (CPU) and can execute a computer program. Furthermore, the computer-readable medium includes any computer-readable storage medium, such as an electronic recording medium (e.g., ROM, flash memory, etc.), a magnetic storage medium (e.g., floppy disk, hard disk, etc.), and an optical reading medium (e.g., CD-ROM, DVD, etc.).

Figure 12:
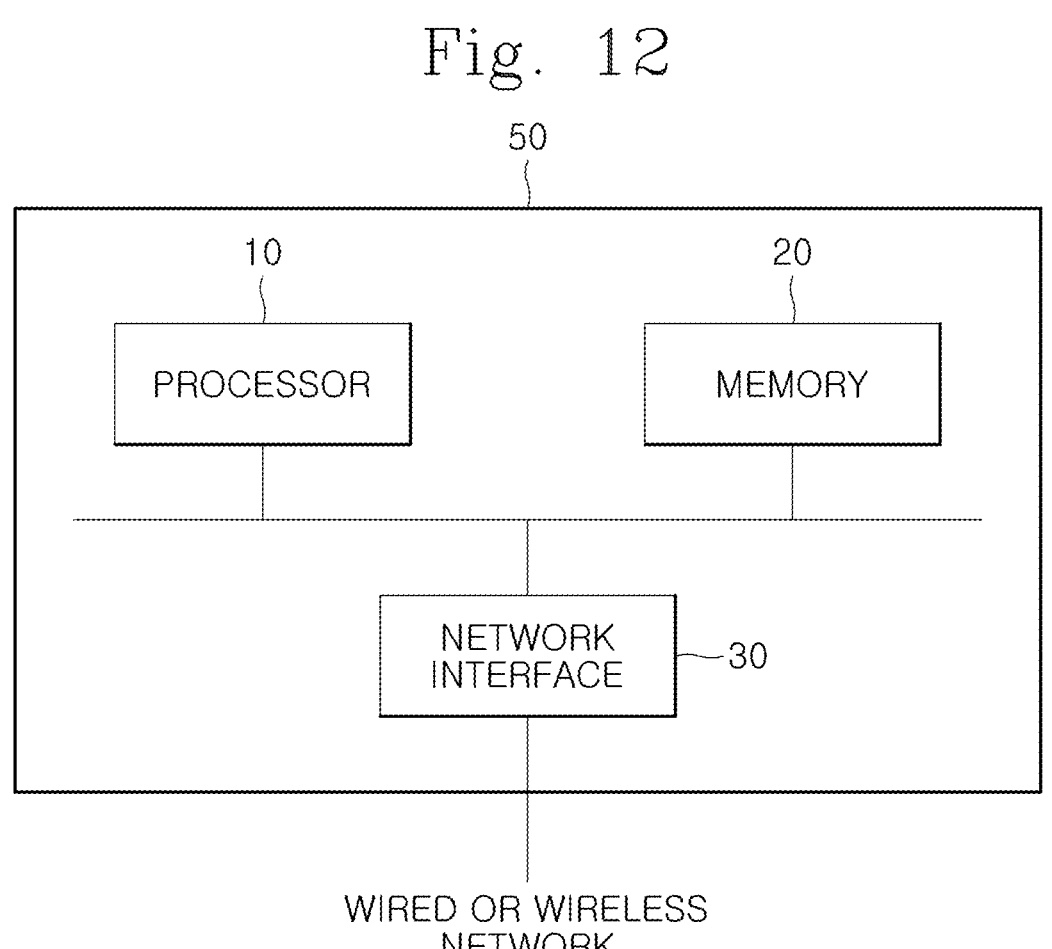
FIG. 12 illustrates a configuration of a device constituting a quantum cryptographic communication system according to an embodiment of the present disclosure.

FIG. 12 illustrates the configuration and operation of a device 50 for constructing a quantum cryptographic communication network according to an embodiment of the present disclosure.

Referring to FIG. 12, the device 50 may be a device, such as a server, for constructing a quantum cryptographic communication network according to the proposed method of the present disclosure.

For example, the device 50 to which the proposed method of the present disclosure may be applied may include a network device such as a repeater, a hub, a bridge, a switch, a router, or a gateway, a computer device such as a desktop computer or a workstation, a mobile terminal such as a smartphone, a portable device such as a laptop computer, a home appliance such as digital TV, or a moving means such as an automobile. In another example, the device 50 to which the present disclosure may be applied may be included as part of an application specific integrated circuit (ASIC) implemented in a system-on-chip (SoC) form.

A memory 20 may be operatively connected to a processor 10, may store programs and/or instructions for processing and control by the processor 10, and may store data and information used in the present disclosure, control information necessary for data and information processing according to the present disclosure, temporary data generated during the data and information processing, and the like. The memory 20 may be implemented as a storage device such as read only memory (ROM), random access memory (RAM), erasable programmable read only memory (EPROM), electrically erasable programmable read-only memory (EE-PROM), flash memory, static RAM (SRAM), a hard disk drive (HDD), or a solid-state drive (SSD).

The processor 10 may be operatively connected to the memory 20 and/or a network interface 30, and controls the operation of each module in the device 50. In particular, the processor 10 may perform various control functions for performing the proposed method of the present disclosure. The processor 10 may be referred to as a controller, a microcontroller, a microprocessor, a microcomputer, and the like. The proposed method of the present disclosure may be implemented by hardware, firmware, software, or a combination thereof. When the present disclosure is implemented using hardware, the processor 10 may include an application specific integrated circuit (ASIC), a digital signal processor (DSP), a digital signal processing device (DSPD), a programmable logic device (PLD), a field programmable gate array (FPGA), or the like configured to perform the present disclosure. On the other hand, when the proposed method of the present disclosure is implemented using firmware or software, the firmware or software may include instructions related to modules, procedures, or functions that perform functions or operations necessary for implementing the proposed method of the present disclosure. The instructions may be stored in the memory 20 or stored in a computer-readable recording medium (not shown) separate from the memory 20, and may be configured to, when executed by the processor 10, cause the device 50 to implement the proposed method of the present disclosure.

Furthermore, the device 50 may include the network interface device 30. The network interface device 30 may be operatively connected to the processor 10, and the processor 10 may control the network interface device 30 to transmit or receive wireless/wired signals carrying information and/or data, signals, messages, etc. over a wireless/wired network. The network interface device 30 may support various communication standards, for example, IEEE 802 series, 3GPP LTE(-A), and 3GPP 5G, and may transmit or receive control information and/or data signals based on the communication standards. The network interface device 30 may be implemented outside the device 50 as necessary.

Accordingly, the method, the device, the system, and the computer program for constructing a quantum cryptographic communication network according to an embodiment of the present disclosure may more efficiently utilize limited quantum key resources to improve communication performance in a quantum cryptographic communication system.

More specifically, the method, the device, the system, and the computer program for constructing a quantum cryptographic communication network, according to an embodiment of the present disclosure, may use a cache server to improve the performance of a quantum cryptographic communication system.

The above description is merely an exemplary description of the technical idea of the present disclosure, and those skilled in the art to which the present disclosure belongs will understand that various modifications and changes can be made without departing from the essential characteristics of the present disclosure. Accordingly, the embodiments described in the present disclosure are intended to describe, not to limit, the technical idea of the present disclosure, and the present disclosure is not limited to these embodiments. The scope of protection of the present disclosure should be interpreted based on the following claims, and all technical ideas equivalent to the claims should be interpreted as falling within the scope of rights of the present disclosure.

What is claimed is:

1. A method for constructing, in a device, a quantum cryptographic communication network comprising multiple unit nodes which comprise multiple quantum cryptographic communication unit nodes, comprising application nodes and quantum key distribution nodes, and one or more relay unit nodes configured to relay between the quantum key distribution nodes, the method comprising:

calculating, for one or more target unit nodes among the multiple unit nodes, a weight reflecting a quantum key demand at the target unit nodes according to communication between the application nodes among the multiple quantum cryptographic communication unit nodes; and selecting one or more unit nodes, which are to be provided with cache servers for the communication between the application nodes, from among the target unit nodes based on the calculated weight.

2. The method of claim 1, wherein in the calculating of the weight, the weight is calculated in consideration of at least one among the number of users of a site corresponding to a source node in the communication between the application nodes, the amount of communication traffic of the site, and the number of hops between the source node and the target unit nodes.

3. The method of claim 2, wherein in the calculating of the weight, the weight is calculated in consideration of whether the target unit nodes are located on a shortest path between the source node and a destination node corresponding to the source node.

4. The method of claim 2, wherein the selecting of the one or more unit nodes comprises:

selecting one or more first unit nodes, which are to be provided with cache servers, from among the target unit nodes based on the weight;

updating weights for remaining unit nodes among the target unit nodes in consideration of the number of hops between the first unit nodes and the remaining unit nodes; and selecting one or more second unit nodes, which are to be provided with cache servers, from among the remaining unit nodes based on the updated weights.

5. The method of claim 4, wherein a predetermined number of unit nodes which are to be provided with cache servers are selected by iteratively updating the weights for the remaining unit nodes.

6. The method of claim 4, wherein at least one of the unit nodes which are to be provided with the cache server comprises the relay unit nodes.

7. A quantum cryptographic communication system comprising multiple unit nodes which comprise: multiple quantum cryptographic communication unit nodes comprising application nodes and quantum key distribution nodes; and one or more relay unit nodes configured to relay between the quantum key distribution nodes, wherein cache servers for communication between the application nodes among the multiple quantum cryptographic communication unit nodes are provided in one or more unit nodes selected from among one or more target unit nodes among the multiple unit nodes based on a weight that is calculated for the target unit nodes and reflects a quantum key demand at the target unit nodes according to the communication between the application nodes.

8. The quantum cryptographic communication system of claim 7, wherein the weight is calculated in consideration of at least one among the number of users of a site corresponding to a source node in the communication between the application nodes, the amount of communication traffic of the site, and the number of hops between the source node and the target unit nodes.

9. The quantum cryptographic communication system of claim 8, wherein the weight is calculated in consideration of whether the target unit nodes are located on a shortest path between the source node and a destination node corresponding to the source node.

10. The quantum cryptographic communication system of claim 8, wherein the cache servers are provided in:

one or more first unit nodes selected from among the target unit nodes based on the weight; and one or more second unit nodes selected from among the remaining unit nodes among the target unit nodes based on weights updated for the remaining unit nodes in consideration of the number of hops between the first unit nodes and the remaining unit nodes.

11. The quantum cryptographic communication system of claim 10, wherein the cache servers are provided in a predetermined number of unit nodes selected by iteratively updating the weights for the remaining unit nodes.

12. The quantum cryptographic communication system of claim 10, wherein at least one of the unit nodes which are to be provided with the cache servers comprises the relay unit nodes.

13. A non-transitory computer-readable storage medium storing instructions configured to cause, when executed by a processor, a device comprising the processor to implement specific operations, wherein the specific operations comprise:

for a quantum cryptographic communication network comprising multiple unit nodes which comprise multiple quantum cryptographic communication unit nodes, comprising application nodes and quantum key distribution nodes, and one or more relay unit nodes configured to relay between the quantum key distribution nodes, calculating, for one or more target unit nodes among the multiple unit nodes, a weight reflecting a quantum key demand at the target unit nodes according to communication between the application nodes among the multiple quantum cryptographic communication unit nodes; and selecting one or more unit nodes, which are to be provided with cache servers for the communication between the application nodes, from among the target unit nodes based on the calculated weight.

* * * * *